United States Patent [19]

Wanous

[11] Patent Number: 5,046,031

[45] Date of Patent: Sep. 3, 1991

[54] METHOD AND APPARATUS FOR AUTOMATIC FLUX-GATE COMPASS CALIBRATION

[75] Inventor: Richard E. Wanous, Lomita, Calif.

[73] Assignee: Magnavox Government and Industrial Electronics Company, Fort Wayne, Ind.

[21] Appl. No.: 306,416

[22] Filed: Feb. 6, 1989

[51] Int. Cl.$^5$ ............................................. G01C 25/00
[52] U.S. Cl. ........................... 364/571.02; 33/356; 364/559; 73/1 E; 324/245
[58] Field of Search ........... 364/559, 434, 453, 571.01, 364/571.02, 454, 457; 33/355 R, 356, 357, 326; 73/1 R, 1 E; 324/202, 244, 245; 340/988

[56] References Cited

U.S. PATENT DOCUMENTS

| | | | |
|---|---|---|---|
| 4,414,753 | 11/1983 | Moulin et al. | 33/356 |
| 4,539,760 | 9/1985 | Marchent et al. | 33/357 X |
| 4,611,293 | 9/1986 | Hatch et al. | 364/571.03 |
| 4,797,841 | 1/1989 | Hatch | 33/355 R X |
| 4,841,449 | 6/1989 | Suyama | 364/449 |
| 4,852,012 | 7/1989 | Suyama | 364/449 |
| 4,866,627 | 9/1989 | Suyama | 364/449 X |

FOREIGN PATENT DOCUMENTS

| | | | |
|---|---|---|---|
| 0214817 | 3/1987 | European Pat. Off. | 33/356 |
| 0135911 | 8/1983 | Japan | 33/356 |
| 0255814 | 11/1987 | Japan | 33/356 |

*Primary Examiner*—Joseph L. Dixon
*Attorney, Agent, or Firm*—Noel F. Heal; Richard T. Seeger

[57] ABSTRACT

A system for automatically compensating for changes in permanent magnetism in a vehicle in which a flux-gate compass is installed. Calibration is initially performed by rotating the vehicle through a full circle and determining from the flux-gate outputs the degree of distortion suffered by an ideally circular performance characteristic. Subsequent flux-gate readings are compensated in accordance with parameters generated during calibration. Parameters relating to offset or displacement of the characteristic are automatically and continually updated to compensate for changes in permanent magnetism of the vehicle, such as might be caused by loading or unloading the vehicle.

16 Claims, 4 Drawing Sheets

METHOD AND APPARATUS FOR AUTOMATIC FLUX-GATE COMPASS CALIBRATION

BACKGROUND OF THE INVENTION

This invention relates generally to flux-gate compasses and, more particularly, to techniques for calibration of flux-gate compasses in moving vehicles. A flux-gate compass is a magnetometer by means of which the direction of the earth's magnetic field may be accurately determined. Flux-gate compasses may be usefully employed on any movable platforms, such as land-based vehicles or ships, and may be integrated into complete navigation systems.

A flux-gate sensor comprises an annular magnetic core and either two or three coils of wire, each of which is wound diametrically about the core. For purposes of explanation, it is easier to assume that there are just two coils, oriented at right-angles to each other. A three-axis magnetometer works on the same principal as the two-axis magnetometer, and there is a mathematical transformation that converts three-axis output signals to the simpler two-axis format. An excitation winding is wrapped about the core at one point in its circumference, and provides a uniform periodic magnetic flux in the core.

When a flux-gate sensor is not subject to any external magnetic field, such as the earth's field, the excitation magnetic flux in the annular core produces zero output voltages at the terminals of both coils. A rigorous mathematical proof of this result can be provided, but it will be apparent that, since the magnetic flux in the annular core passes through each coil twice, in opposite directions, one might expect an induced voltage of zero in each coil.

When the flux-gate sensor is placed in the earth's magnetic field, the magnetic symmetry of the sensor is disturbed and the two coils generate output voltages indicative of the direction of the earth's field. The basic mathematics of the two-axis and three-axis flux-gate sensor are derived in a paper by Timothy J. Peters, entitled "Automobile Navigation Using a Magnetic Flux-Gate Compass," IEEE Trans. on Vehicular Technology, Vol. VT-35, No. 2, May 1986, pp. 41–47. As derived in this paper, the voltage output signals, $v_x$ and $v_y$, from the two coils, designated the x coil and the y coil, are alternating signals directly proportional to $\sin \phi$ and $\cos \phi$, respectively, where $\phi$ is the angle between magnetic north and the direction in which the plane of the x coil is aligned. Again, the rigorous mathematical proof of this result is lengthy, but the result agrees with intuition. With the x coil aligned to magnetic north ($\phi = 0$), one might expect the effect on the x coil to be zero, since the earth's field would not pass axially through the coil, and one might expect the effect on the y coil to be maximized, since the earth's field would be axially aligned with that coil. As the coils are rotated (and $\phi$ increased), one might also expect the x coil output to increase from zero and the y coil output to decrease from its maximum. These expectations all comport with the variation of the sine function for the x coil output and the cosine function for the y coil output.

In the usual mode of operation of a flux-gate compass, the angle $\phi$ is computed from:

$$\phi = \tan^{-1}(v_x/v_y).$$

It will be apparent from the sine-cosine relationship of $v_x$ and $v_y$ that, for a perfect flux-gate compass, a plot of $V_x$ versus $v_y$ for all values of $\phi$ will be circular in shape. Theoretically, this circular characteristic would be obtained if the values of $v_x$ and $v_y$ were measured and plotted while the compass was rotated through 360 degrees. However, various magnetic effects distort the earth's field as seen by the flux-gate compass, and the resultant characteristic is distorted from a perfect circle to an ellipse that is tilted with respect to the x and y axes and is displaced from the origin of the axes. The two most important sources of magnetic distortion are permanent and induced magnetism in the vehicle in which the compass is installed.

U.S. Pat. No. 4,611,293 to Hatch et al. discloses a technique for calibrating a compass to compensate for these distortions. Part of this technique involves transforming the elliptical characteristic to a circle with a radius equal to half the width of the ellipse along its minor axis. The principal drawback of the technique is that the vehicle must be rotated through 360 degrees to perform the calibration. In fact, this is a requirement of all calibration techniques prior to the present invention. Unfortunately, the permanent magnetism effects that distort the compass characteristic are very much dependent on the load carried by the vehicle. If the vehicle loads or unloads a cargo containing magnetic materials, the compass is moved out of calibration. Driving the vehicle in a circle for recalibration may not be convenient, and the compass readings will be suspect until such time as calibration is possible.

It will be appreciated from the foregoing that there is a need for further improvement in compasses employing the flux-gate principle. In particular, what is needed is a flux-gate compass that performs calibration without the need to rotate the vehicle through 360 degrees. The present invention fulfills this need.

SUMMARY OF THE INVENTION

The present invention resides in a technique for calibrating a flux-gate compass on an automatic and continual basis, without the need for driving in a full circle each time that calibration is necessary. Briefly, and in general terms, the method of the invention comprises the steps of performing an initial calibration, to determine various parameters distorting the performance characteristic of the compass, and then continuously and automatically revising a significant one of the parameters relating to the effects of permanent magnetism in the vehicle.

More specifically, the method of the invention includes the steps of performing an initial calibration to determine the proportions, orientation and offset position of an elliptical performance characteristic derived from output signals from a flux-gate compass having a multiple-axis flux sensor installed in a vehicle; transforming the elliptical characteristic to a circular one; obtaining successive sets of readings from the flux-gate compass, for the determination of compass bearings; compensating each of the successive sets of flux-gate readings to conform with the circular characteristic, based on the determinations of the proportions, orientation and offset position of the elliptical characteristic; and revising the determination of the offset position of the elliptical characteristic for use in subsequent steps of compensating the flux-gate readings, whereby successive revising steps result in convergence of the offset position on a new value to compensate for changes in permanent magnetism in the vehicle.

In the invention as disclosed, the step of performing an initial calibration includes rotating the vehicle through a complete circle, taking successive flux-gate readings at successive positions while the vehicle is being rotated, and determining from the readings a set of parameters defining the degree to which the elliptical characteristic is distorted from the corresponding circular characteristic. if the compass is a three-axis type, the readings are transformed to equivalent two-axis readings to facilitate further processing.

In the illustrative embodiment, the step of transforming the elliptical characteristic to the circular one includes removing the positional offset of the characteristic, rotating the elliptical characteristic, and scaling the elliptical characteristic to conform with a circle.

More specifically, the step of revising includes determining an measured radius of the circular response characteristic from the readings obtained, determining a correction value by subtracting from the measured radius a previously determined radius, and determining a new offset position for the circular response characteristic, derived from the prior offset position and the correction value determined in the previous step.

Even more specifically, if the transformed two-axis readings obtained are represented by $X_A$ and $Y_A$, the measured radius R is determined from the equation $R^2 = (X_A)^2 + (Y_A)^2$, and the correction value is $\Delta$. Also the new offset position is determined from the equations:

$$X_2 = X_1 + \Delta_1 \sin H, \text{ and}$$

$$Y_2 = Y_1 + \Delta_1 \cos H,$$

where $X_2$, $Y_2$ is the new offset position, $X_1$, $Y_1$ is the old offset position, and H is a heading angle given by $H = \tan^{-1}(X_A/Y_A)$.

Stated in slightly different terms, the method of the invention includes the steps of (a) obtaining two-axis readings from the flux-gate compass; (b) transforming the two-axis readings to conform to a circular performance characteristic; (c) determining a measured radius of the circular performance characteristic from the readings obtained in steps (a) and (b); (d) determining a correction value by subtracting from the measured radius a previously determined radius; (e) determining a new offset position for the circular response characteristic, derived from a prior offset position and the correction value determined in step (d); and (f) using the new offset position in the transformation of subsequent compass readings to conform to the circular characteristic.

In terms of apparatus, the invention includes means for performing an initial calibration to determine the proportions, orientation and offset position of an elliptical performance characteristic derived from output signals from a flux-gate compass; means for transforming the elliptical characteristic to a circular one; means for obtaining successive sets of readings from the flux-gate compass, for the determination of compass bearings; means for compensating each of the successive sets of flux-gate readings to conform with the circular characteristic, based on the determinations of the proportions, orientation and offset position of the elliptical characteristic; and means for revising the determination of the offset position of the elliptical characteristic for use in subsequent steps of compensating the flux-gate readings, whereby successive revisions result in convergence of the offset position on a new value to compensate for changes in permanent magnetism in the vehicle.

It will be appreciated from the foregoing that the present invention represents a significant improvement in the field of flux-gate compasses. Specifically, the improvement provides for automatic calibration of the compass without having to drive the vehicle through a full circle each time the vehicle permanent magnetism is changed. Other aspects and advantages of the invention will become apparent from the following more detailed description, taken in conjunction with the accompanying drawings.

DESCRIPTION OF THE PREFERRED EMBODIMENT

Figure 1:
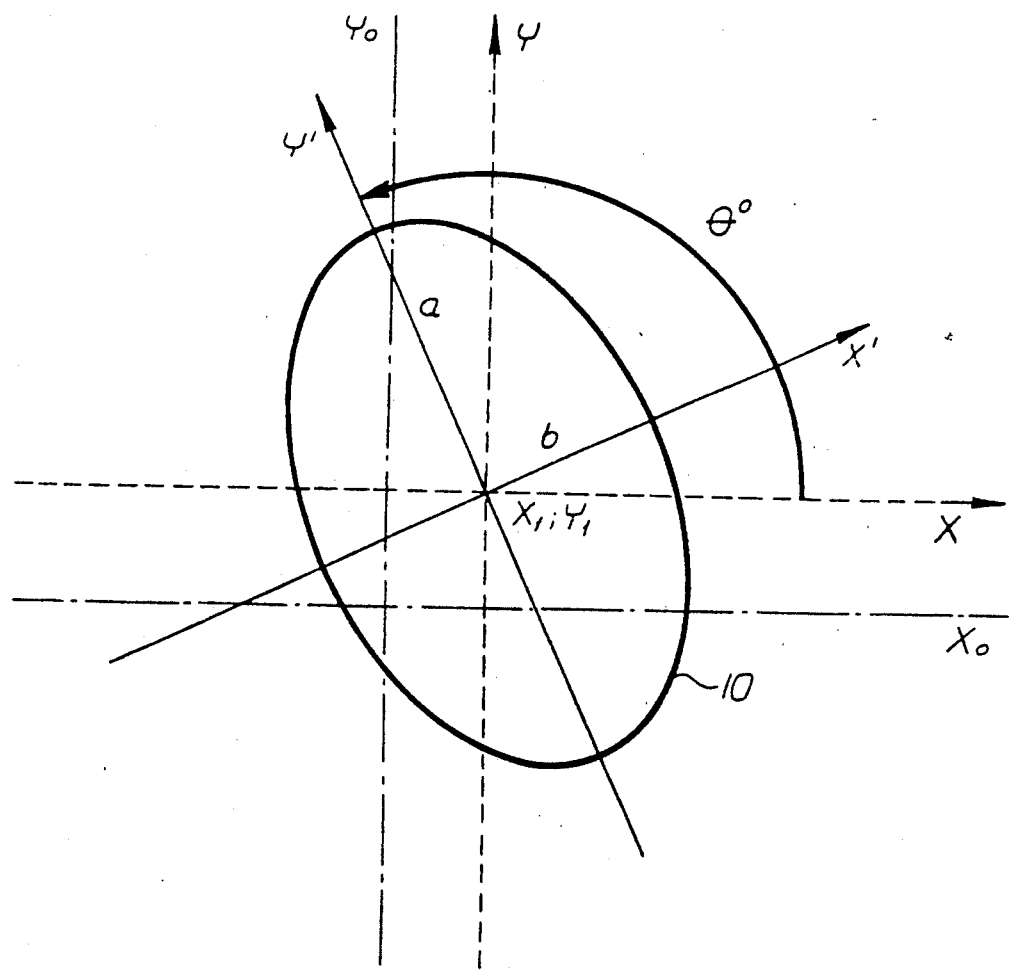
FIG. 1 is a graph showing an elliptical characteristic formed by plotting readings taken from a two-axis flux-gate compass.

As shown in the drawings for purposes of illustration, the present invention is concerned with a calibration technique for flux-gate compasses. As discussed in the foregoing background section, a plot of the two output signals from a two-axis flux-gate compass, as the compass is rotated through a 360 degrees, is ideally a perfect circle. If the output signals are, for simplicity, referred to as x and y and are normalized such that the maximum value of each is one, then the following relationships hold for a perfect flux-gate compass:

$x = \sin H$, $y = \cos H$, and $r^2 = x^2 + y^2 = 1$, where H is the heading angle of the vehicle, measured clockwise from magnetic north.

However, this perfectly circular characteristic is distorted into an ellipse that is rotated and displaced with respect to the x and y axes. In FIG. 1, the axes $X_0$ and $Y_0$ are those for which the perfectly circular characteristic would be plotted. There are two types of magnetic effects that distort the compass characteristic. Changes in permanent magnetism of the vehicle affect the compass characteristic by displacing the elliptical characteristic to a new position. The other distortion effect is caused by induced magnetism, and results in flattening and rotation of the elliptical characteristic. Distortions of this latter type are affected very little by vehicle load changes. Distortions of the former type, relating to permanent magnetism of the vehicle, are significantly affected by changes in the vehicle load. It was the discovery of this distinction that led to the present invention, since it appeared that calibration could be performed based only on compensation for displacement of the characteristic from a central position.

In the diagram of FIG. 1, permanent magnetism effects of the vehicle have shifted the center of the characteristic to a new position, given by $X_1$, $Y_1$, which is shown as the origin of a new set of axes X, Y. The characteristic, indicated by reference numeral 10, is also flattened into an elliptical form having a semimajor-axis length of 'a' and a semiminor-axis length of 'b,' and is rotated counterclockwise through an angle $\theta$. The ellipse 10 is shown as having a new set of rotated axes X', Y' with the same origin as axes X, Y.

Figure 2A:
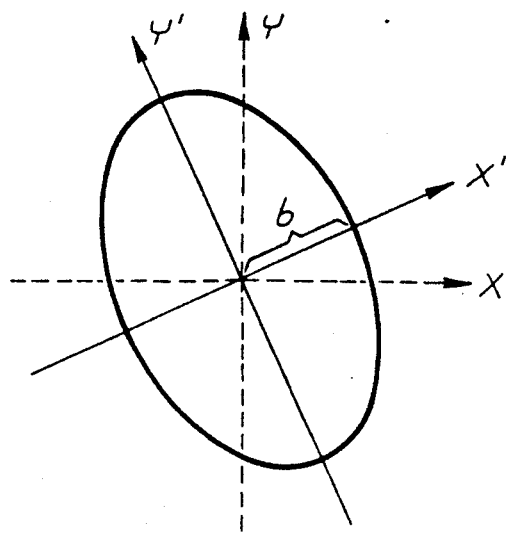
FIGS. 2a–2d are graphs showing the sequential steps performed in transforming the elliptical characteristic of FIG. 1 to a circular characteristic.
Figure 2B:
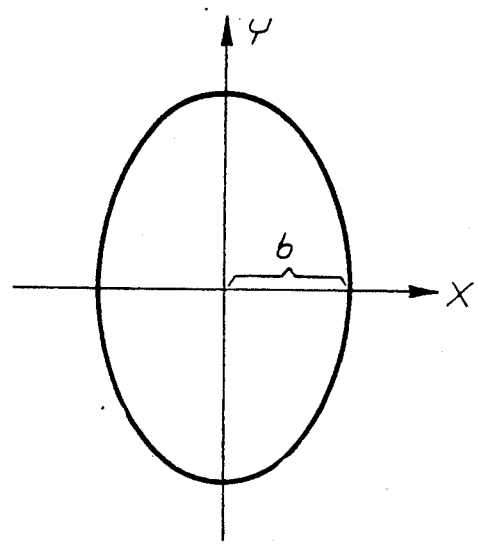
Figure 2C:
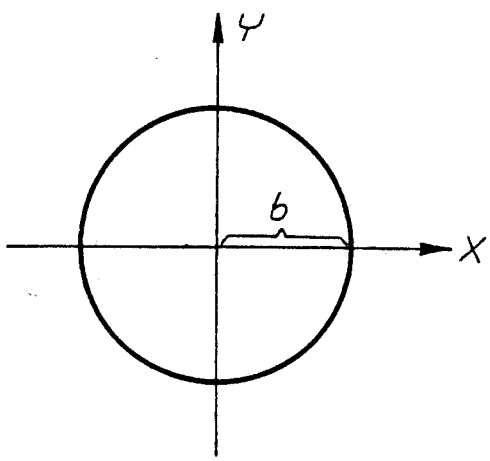
Figure 2D:
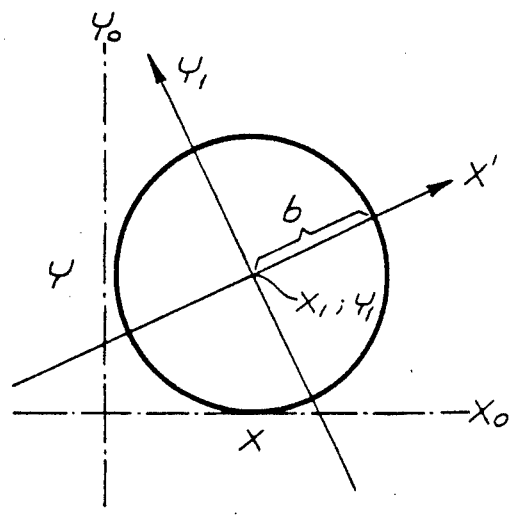

Using mathematical transformations described in detail in the aforementioned Hatch et al. patent, the elliptical characteristic of FIG. 1 can be converted to a circular characteristic centered at $X_1, Y_1$. This transformation is performed in four steps. First the ellipse 10 centered on $X_1, Y_1$, as shown in FIG. 1, is transformed to a new set of axes X, Y having their origin at the point $X_1, Y_1$ with respect to the $X_0, Y_1$ axes, as shown in FIG. 2a. Then the ellipse is effectively rotated about its center until the major axis is aligned with the Y axis and the minor axis is aligned with the X axis, as shown in FIG. 2b. Next the ellipse of FIG. 2b is reduced to a circle of radius 'b' equal to half the minor axis, as shown in FIG. 2c. Finally, the center of the circular characteristic of FIG. 2c is displaced back to the point $X_1, Y_1$, by transforming the circle back to the original set of axes $X_0, Y_0$, as shown in FIG. 2d. This derived circular characteristic of FIG. 2d has a radius proportional to the magnitude of the earth's magnetic field being measured, and an offset center proportional to the permanent magnetism effects.

Figure 3A:
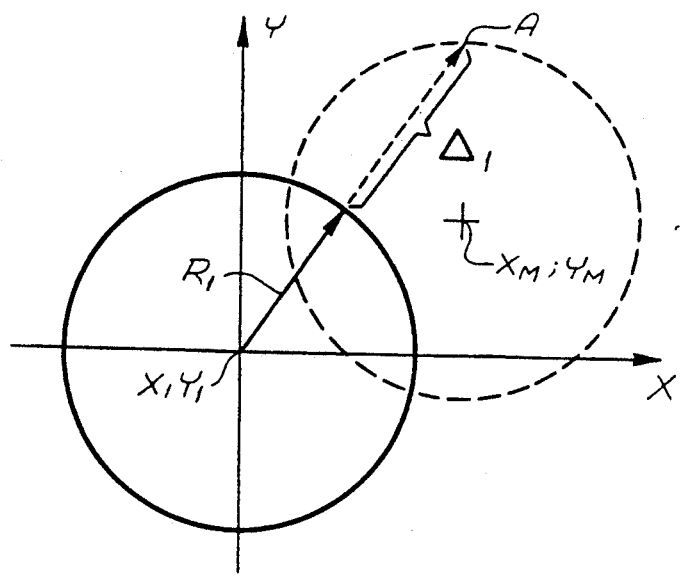
FIGS. 3a–3c are graphs showing two sequential steps of automatic calibration in accordance with the invention.

FIGS. 3a-3d illustrate how this derived circular characteristic is used in accordance with the invention. In FIG. 3a, the solid circle centered at $X_1, Y_1$ is the circular equivalent of the elliptical characteristic of the flux-gate compass being calibrated. The radius 'r' of the circle represents the magnitude of earth's magnetic field as measured by the flux-gate compass, and is a value obtained routinely when the compass is initially calibrated by rotating the vehicle. If the compass is out of calibration due to changes in permanent magnetism, the derived circular characteristic will be displaced to a new location, as indicated, for example, by the broken circle centered at $X_M, Y_M$. This new center position is not known or easily measurable, but the technique of the invention is to move the solid circular characteristic continually in such a manner that there will be rapid convergence on the new position $X_M, Y_M$.

For a particular heading of the vehicle, indicated by the radial line $R_1$ drawn from $X_1, Y_1$, the compass will derive a longer "radius." That is to say, the compass will assume that the radius of the characteristic is the distance from A to the origin $X_1, Y_1$. This measured radius is longer than the real radius by an amount $\Delta_1$. As will be appreciated, for certain headings this difference value will be negative. The compensation action of the invention has the effect of moving the center of the circle along line $R_1$ by an amount $\Delta_1$, to a new center point $X_2, Y_2$, the point at which the solid circle is centered in FIG. 3b. The compensating action places the solid circle such that the point A is now on the circumference of the circle.

Figure 3B:
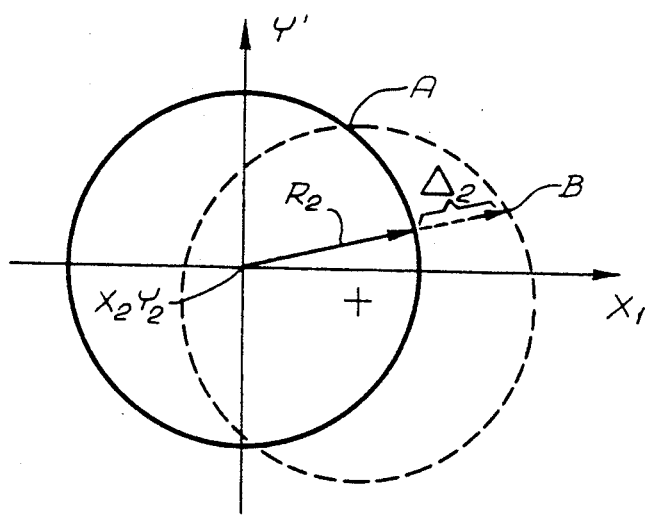
Figure 3C:
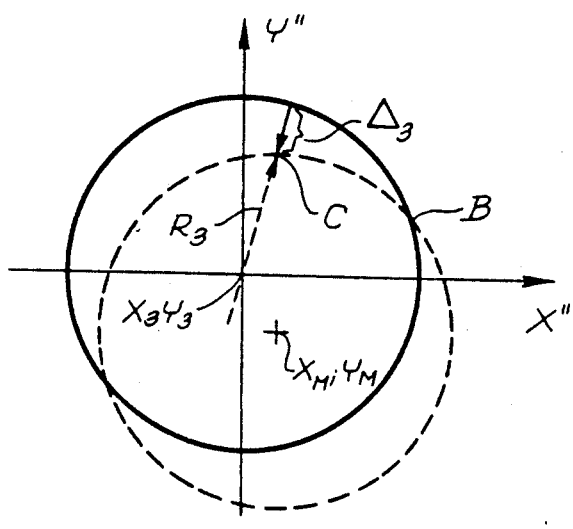

In FIG. 3b, the solid circle centered at $X_2, Y_2$ is closer to the real center $X_M, Y_M$, and may be considered as centered at the origin of a new set of axes X', Y'. Now it is assumed that the vehicle has a heading conforming to the radial line $R_2$, and a compass reading is derived from point B on the broken circle, which, it will be recalled, is indicative of the observable characteristic of the device. This time the measured "radius" from the origin $X_2, Y_2$ to the point B is longer than the true radius by $\Delta_2$. Therefore, the solid circle of FIG. 3b is displaced by $\Delta_2$ along the radius $R_2$. This moves the solid circle to a new location $X_3, Y_3$, as shown in FIG. 3d, centered at the origin of axes X", Y". The point B is now on the solid circle, but there is still not complete correspondence between the two circles. On the next measurement of compass heading, a point C is observed as being on the circular characteristic. This time the "radius" from C to the origin of axes X", Y" is shorter than the true radius of the circle $R_3$, by an amount $\Delta_3$. The axes X", Y" are moved again, along radius $R_3$ to position $X_4, Y_4$, not shown in the drawings.

Each time the system performs a measurement, there is an automatic calibration step that moves the theoretical center of the circular calibration curve a little closer to the center $X_M, Y_M$ of the actual characteristic curve of the device. These steps take place periodically, such as every half second, as the vehicle is being driven about in normal operation. After loading or unloading any iron products, it typically take only a minute or so of normal driving, depending on the number of turns made, to recalibrate the compass by shifting the circular characteristic to a new position. The method is so effective that it virtually eliminates the need for more than one calibration by deliberate rotation of the vehicle.

The automatic calibration technique of the invention depends on there being an initial calibration step in which the vehicle is rotated through 360 degrees. This provides raw data corresponding to an elliptical characteristic like the one shown in FIG. 1. From this data, the elliptical characteristic is transformed to a circular characteristic having a radius 'b' and a center at point $X_1, Y_1$ with respect to axes $X_0, Y_0$. Further, as elaborated on in the aforementioned patent, each new observation of x and y values can be converted to conform to the circular characteristic, using parameters derived in the initial calibration process.

The process described in the previous paragraph is basically the one set forth in the prior patent. An elliptical characteristic determined by rotation of the vehicle is converted to a circular characteristic, and each subsequent set of readings is also transformed to the circular form for computation of the heading of the vehicle. What this invention does in addition is to provide automatic compensation when the elliptical characteristic moves to a different offset position, because of a changed permanent magnetism effect in the vehicle.

As a result of the initial, or most recent, calibration process, the equivalent circular characteristic is centered at $X_1, Y_1$ as shown in FIG. 3a. As a result of a new observation at A, new values $X_A$ and $Y_A$ are obtained, and a new measured "radius" R, given by $R^2 = (X_A)^2 + (Y_A)^2$. The difference $\Delta_1$ is then given by R - b, where b is the radius of the solid circle in FIG. 3. A value can also be computed for the vehicle heading H, from the relation $$H = \tan^{-1}(X_A/Y_A)$$

The new location of the center of the circle is then given by:

$$X_2 = X_1 + \Delta_1 \sin H$$

$$Y_2 = Y_1 + \Delta_1 \cos H$$

The new offset values for the center of the circular characteristic are used in the processing the next measured heading, and the process is repeated. Each new observed heading results in a new correction for the offset coordinates, and there is rapid convergence on the new values $X_M$, $Y_M$. The process of calibration is, therefore, automatic and continuous. When a load change renders the current calibration inaccurate, recalibration is achieved in a minute or two, depending on the number of turns made by the vehicle.

Operation of the invention in the case of a three-axis flux-gate is fundamentally the same. As indicated in the aforementioned issued patent, the three-axis version may be transformed mathematically to the two-axis case, to derive corresponding x and y values from the three output values provided by a three-axis system.

Figure 4:
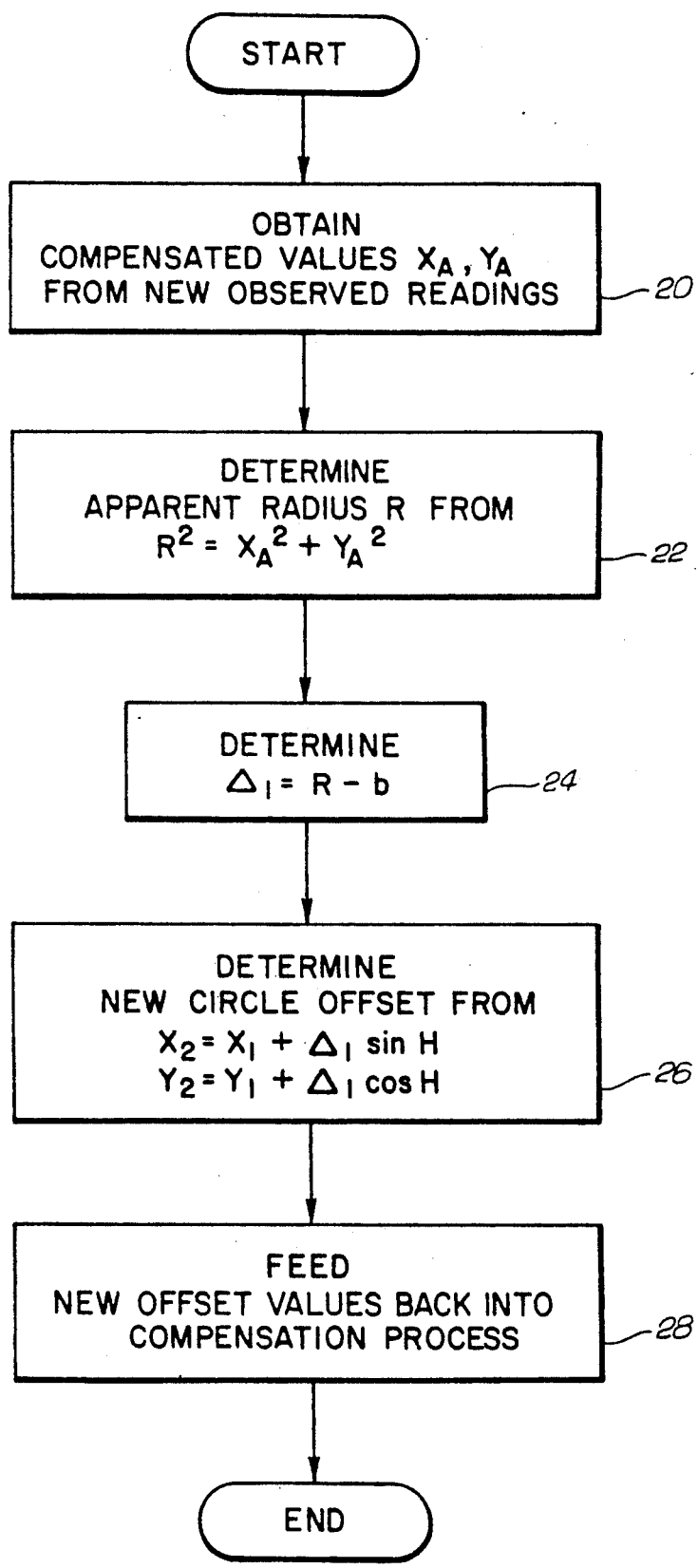
FIG. 4 is a flowchart showing the functions performed during automatic recalibration in accordance with the invention.

The invention is most conveniently implemented in software or firmware form. The hardware and software needed to perform the initial calibration is fully disclosed in the aforementioned patent. The additional software needed to perform the ongoing automatic is illustrated in the flowchart of FIG. 4.

As indicated at block 20, the first additional step performed by the system is to obtain compensated values for newly observed readings, given by $X_A, Y_A$ and for the new heading H, given by $\tan^{-1}(X_A/Y_A)$. Then, as indicated in block 22, a new value of the observed radius R is computed from the relation $$R^2 = (X_A)^2 + (Y_A)^2,$$

and in block 24 a radius correction is computed from $\Delta_1 = R - b$, where b is the radius obtained in the initial calibration of the system. As shown in block 26, the next step is to compute a new offset for the circular characteristic of the system. If the previous offset was $X_1, Y_1$, the new offset is given by:

$$X_2 = X_1 + \Delta_1 \sin H$$

$$Y_2 = Y_1 + \Delta_1 \cos H$$

Finally, as shown in block 28, the new offset values are fed back to the compensation process, for use in compensating the next observed compass readings. As will be appreciated, the programming of these steps is well within the skill of anyone with knowledge of programmable microprocessors or equivalent hardware.

It will be appreciated from the foregoing that the present invention represents a significant advance in the field of flux-gate compasses. In particular, the invention provides for automatic and continuous calibration for changes in permanent magnetism of the vehicle in which the compass is used. It will also be appreciated that, although an embodiment of the invention has been described in detail for purposes of illustration, various modifications may be made without departing from the spirit and scope of the invention. For example, although the invention is described, for the most part, in terms relating to a two-axis flux-gate compass, it will be appreciated that the same principles may be applied to a three-axis flux-gate compass, with appropriate transformations of the compass output signals. Further, although the word "vehicle" is used repeatedly to describe the environment in which the compass of the invention is used, it should be understood that this term is intended to encompass all movable platforms, including ships and aircraft as well as land-based vehicles. Accordingly, the invention is not intended to be limited by the illustrative embodiment described in this specification.

I claim:

1. A method for automatic and continuous calibration of a flux-gate compass in a vehicle, comprising the steps of:
   performing an initial calibration to determine the dimensions, orientation and offset position of an elliptical performance characteristic derived from output signals from a flux-gate compass having a multiple-axis flux sensor and installed in a vehicle;
   transforming the elliptical characteristic to a circular characteristic having a radius referred to as the reference radius;
   operating the vehicle and, in so doing, continually changing its angular orientation;
   subjecting the vehicle to possible changes in permanent magnetism;
   while the vehicle is being operated, obtaining successive sets of readings from the flux-gate compass, for the determination of compass bearings for use in navigating the vehicle;
   transforming each of the successive sets of readings to conform with the circular characteristic, based on the determinations of the dimensions, orientation and offset position of the elliptical characteristic; and
   after transforming each of the successive sets of readings, calibrating the flux gate compass by revising the determination of the offset position of the elliptical characteristic for use in subsequent steps of transforming the successive sets of flux-gate readings, whereby successive revising steps performed after obtaining successive sets of readings from the flux-gate compass, at different angular orientations of the vehicle, result in convergence of the offset position on a new value to compensate for any changes in permanent magnetism in the vehicle.

2. A method as defined in claim 1, wherein the step of performing an initial calibration includes:
   rotating the vehicle through a complete circle;
   taking successive flux-gate readings at successive positions while the vehicle is being rotated; and
   determining from the readings a set of parameters defining the degree to which the elliptical characteristic is distorted from the corresponding circular characteristic.

3. A method as defined in claim 1, wherein the step of transforming the elliptical characteristic to the circular one includes:
   removing the positional offset of the characteristic;
   rotating the elliptical characteristic; and
   scaling the elliptical characteristic to conform with a circular characteristic.

4. A method as defined in claim 1, wherein the step of revising includes:
   determining a measured radius of the circular characteristic from the readings obtained;
   determining a correction value by subtracting the reference radius from the measured radius; and
   determining a new offset position for the circular characteristic, derived from the prior offset position and the correction value determined in the previous step.

5. A method as defined in claim 4, wherein:
   the method includes an additional step of converting, if necessary, the compass output readings to a two-axis form;

the successive sets of readings, after transformation to conform with the circular characteristic, are represented by $X_A$ and $Y_A$;

the measured radius R is determined from the relationship $R^2 = (X_A)^2 + (Y_A)^2$;

the correction value is $\Delta$; and the new offset position is determined from the equations $$X_2 = X_1 + \Delta_1 \sin H, \text{ and}$$

$$Y_2 = Y_1 + \Delta_1 \cos H,$$

wherein $X_2, Y_2$ is the new offset position, $X_1, Y_1$ is the old offset position, and H is a heading angle given by $H = \tan^{-1}(X_A/Y_A)$.

6. A method for automatic and continuous calibration of a flux-gate compass installed in a vehicle, comprising the steps of:
(a) operating the vehicle and, in so doing, continually changing its angular orientation;
(b) subjecting the vehicle to possible changes in permanent magnetism;
(c) while the vehicle is being operated, obtaining successive two-axis readings from the flux-gate compass, for use in navigating the vehicle;
(d) transforming the two-axis readings to conform to a circular performance characteristic;
(e) determining a reference radius and a current offset position of the circular performance characteristic;
(f) determining a measured radius of the circular performance characteristic from a pair of the readings obtained in steps (c) and (d);
(g) determining a correction value by subtracting the reference radius from the measured radius;
(h) calibrating the flux gate compass by determining a new offset position for the circular performance characteristic, derived from the current offset position and the correction value determined in step (g);
(i) using the new offset position in the transformation of subsequent compass readings to conform to the circular performance characteristic;
(j) saving the new offset position for subsequent use as the current offset position; and
(k) repeating steps (f) through (j) for successive sets of flux-gate compass readings obtained at different angular orientations of the vehicle, to obtain successive new offset positions.

7. A method as defined in claim 6, wherein:
the transformed two-axis readings obtained in step (b) are $X_A$ and $Y_A$;
the measured radius R is determined from the relationship $R^2 = (X_A)^2 + (Y_A)^2$;
the correction value is $\Delta$; and
the new offset position is determined from the equations $$X_2 = X_1 + \Delta_1 \sin H, \text{ and}$$

$$Y_2 = Y_1 + \Delta_1 \cos H,$$

where $X_2, Y_2$ is the new offset position, $X_1, Y_1$ is the old offset position, and H is a heading angle given by $H = \tan^{-1}(X_A/Y_A)$.

8. A method as defined in claim 6, wherein:
the flux-gate compass is of the two-axis form.

9. A method as defined in claim 6, wherein:
the flux-gate compass is of the three-axis form; and
step (a) includes transforming three-axis compass readings to two-axis compass readings.

10. Flux-gate compass apparatus for installation in a vehicle, the apparatus comprising:
a flux-gate compass;
means for performing an initial calibration to determine the dimensions, orientation and offset position of an elliptical performance characteristic derived from output signals from the flux-gate compass;
means for transforming the elliptical characteristic to a circular characteristic having a radius referred to as the reference radius;
means for obtaining successive sets of readings from the flux-gate compass, for the determination of compass bearings while the vehicle is moved about in normal operation and is subject to possible changes in permanent magnetism;
means for transforming each of the successive sets of flux-gate readings, corresponding to different angular orientations of the vehicle, to conform with the circular characteristic, based on the determinations of the dimensions, orientation and offset position of the elliptical characteristic; and
means for calibrating the flux gate compass by revising the determination of the offset position of the elliptical characteristic for use in subsequently transforming successive sets of flux-gate readings, whereby successive revisions performed after obtaining successive sets of readings from the flux-gate compass, at different angular orientations of the vehicle, result in convergence of the offset position on a new value to compensate for any changes in permanent magnetism in the vehicle.

11. Apparatus as defined in claim 10, wherein the means for revising includes:
means for determining a measured radius of the circular characteristic from the readings obtained;
means for determining a correction value by subtracting the reference radius from the measured radius; and
means for determining a new offset position for the circular characteristic, derived from the prior offset position and the correction value determined by the previously recited means for determining.

12. Apparatus as defined in claim 11, wherein:
the apparatus includes means for converting, if necessary, the compass output readings to a two-axis form;
the compensated two-axis readings obtained are represented by $X_A$ and $Y_A$;
the measured radius R is determined from the relationship $R^2 = (X_A)^2 + (Y_A)^2$;
the correction value is $\Delta$; and
the new offset position is determined from the equations $$X_2 = X_1 + \Delta_1 \sin H, \text{ and}$$

$$Y_2 = Y_1 + \Delta_1 \cos H,$$

where $X_2, Y_2$ is the new offset position, $X_1, Y_1$ is the old offset position, and H is a heading angle given by $H = \tan^{-1}(X_A/Y_A)$.

13. Apparatus for automatic and continuous calibration of a flux-gate compass installed in a vehicle, the apparatus comprising:
(a) a flux-gate compass;

(b) means for obtaining successive two axis readings from the flux-gate compass while the vehicle is in normal operation and its angular orientation is continually changing;

(c) means for transforming the readings obtained by the means (b) to conform to a circular performance characteristic having a radius referred to as the reference radius and an offset position initially used as a current offset position;

(d) means for determining a measured radius of the circular performance characteristic from a pair of the readings obtained by the means (c);

(e) means for determining a correction value by subtracting the reference radius from the measured radius;

(f) means for calibrating the flux gate compass by determining a new offset position for the circular performance characteristic, derived from the current offset position and the correction value determined by means (d) and (g) means for using the new offset position in the transformation of subsequent compass readings, obtained at different angular orientations of the vehicle, to conform with the circular performance characteristic.

14. Apparatus as defined in claim 13, wherein:

the transformed two-axis readings obtained by means (c) are $X_A$ and $Y_A$;

the measured radius R is determined from the relationship $R^2 = (X_A)^2 + (Y_A)^2$;

the correction value is $\Delta$; and the new offset position is determined from the equations $$X_2 = X_1 + \Delta_1 \sin H, \text{ and}$$

$$Y_2 = Y_1 + \Delta_1 \cos H,$$

where $X_2, Y_2$ is the new offset position, $X_1, Y_1$ is the old offset position, and H is a heading angle given by $H = \tan^{-1}(X_A/Y_A)$.

15. Apparatus as defined in claim 13, wherein:
the flux-gate compass is of the two-axis form.

16. Apparatus as defined in claim 13, wherein:
the flux-gate compass is of the three-axis form; and
means (b) includes means for transforming three-axis compass readings to two-axis compass readings.

* * * * *